United States Patent
Bai et al.

(10) Patent No.: US 9,961,238 B2
(45) Date of Patent: May 1, 2018

(54) COLOR GAMUT SIZE METRIC ESTIMATION

(71) Applicant: Apple Inc., Cupertino, CA (US)

(72) Inventors: Yingjun Bai, San Jose, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 14/872,114

(22) Filed: Sep. 30, 2015

(65) Prior Publication Data

US 2016/0360068 A1 Dec. 8, 2016

Related U.S. Application Data

(60) Provisional application No. 62/172,132, filed on Jun. 7, 2015.

(51) Int. Cl.
 *H04N 1/60* (2006.01)
 *G06T 11/00* (2006.01)

(52) U.S. Cl.
 CPC ........... *H04N 1/6061* (2013.01); *G06T 11/00* (2013.01)

(58) Field of Classification Search
 CPC .. H04N 1/6066; H04N 1/6058; H04N 1/6061; G09G 2320/0666
 See application file for complete search history.

(56) References Cited

U.S. PATENT DOCUMENTS

| | | | |
|---|---|---|---|
| 5,704,026 A | 12/1997 | Wan | |
| 8,373,898 B2 | 2/2013 | Bonnier | |
| 8,497,926 B2* | 7/2013 | Mizukura | H04N 1/6058 348/272 |
| 8,654,141 B2 | 2/2014 | Zhang | |
| 2009/0238456 A1* | 9/2009 | Fukasawa | H04N 1/6058 382/167 |
| 2012/0194578 A1 | 8/2012 | Znamenskiy | |

* cited by examiner

*Primary Examiner* — Antonio A Caschera
(74) *Attorney, Agent, or Firm* — Blank Rome LLP

(57) ABSTRACT

A gamut size metric is used in all phases of color image processing (e.g., capture, transmission, and display). In general, the gamut size metric is a single-valued metric that changes as image content changes. More particularly, a gamut boundary histogram is determined and used to estimate a gamut size metric. A gamut size metric identifies a minimum size gamut needed to encompass each pixel in an image, where the gamut size is limited at one end by a first device independent gamut ($S_1$), and at another end by a second device independent color space ($S_2$), where $S_1$ is wholly enclosed within $S_2$. The gamut size metric may be based on strict pixel color value differences. In other embodiments the gamut size metric may take into effect perceptual color differences and significance.

21 Claims, 5 Drawing Sheets

COLOR GAMUT SIZE METRIC ESTIMATION

BACKGROUND

A color model is an abstract mathematical model describing the way colors can be represented as tuples of numbers (e.g. three-tuples in sRGB and four-tuples in CMYK). The provision of a specific mapping function between a color model and a reference color space establishes a specific "footprint" within the color space referred to as a gamut. Thus, a gamut indicates the envelope, or volume of color, a specific device can render in a color space. When defining a color space, a usual reference standard is the CIEXYZ color space, which represents the spectral responses of the human eye, or the CIELAB color space, where equal distances in the space corresponds (very roughly) to equal perceptual color differences (a "perceptually uniform" color space). Referring to FIG. 1, there is shown the wide gamut RGB color space 100, the sRGB color space 105, the CMYK color space 110, and the $D_{93}$, $D_{65}$ and $D_{50}$ white points 115 relative to the visible color spectrum 120 in the CIE xy chromaticity diagram.

In digital imaging applications, there is often a need to efficiently estimate an image's color gamut boundary, i.e. the smallest gamut size needed to render all colors in the image with good visual accuracy. A gamut size metric could provide a way to determine if a wider gamut is needed to represent a particular image, and if so how wide it needs to be. Such a metric has applications at all stages of color imaging processing.

SUMMARY

In one embodiment, the disclosed concepts provide a method for gamut size estimation. The method includes obtaining a color image. The method also includes, for a plurality of pixels in the color image, determining a gamut boundary value for the pixel, wherein the gamut boundary value identifies a smallest size gamut that encapsulates the pixel, and incrementing a bin of a gamut boundary histogram that corresponds to the gamut boundary value. The method also includes determining a gamut size metric based on the gamut boundary histogram, wherein the gamut size gamut is indicative of the minimum gamut needed to represent the color image.

In another embodiment, the method may be embodied in computer executable program code and stored in a non-transitory storage device. In yet another embodiment, the method may be implemented in an electronic device.

DETAILED DESCRIPTION

Figure 1:
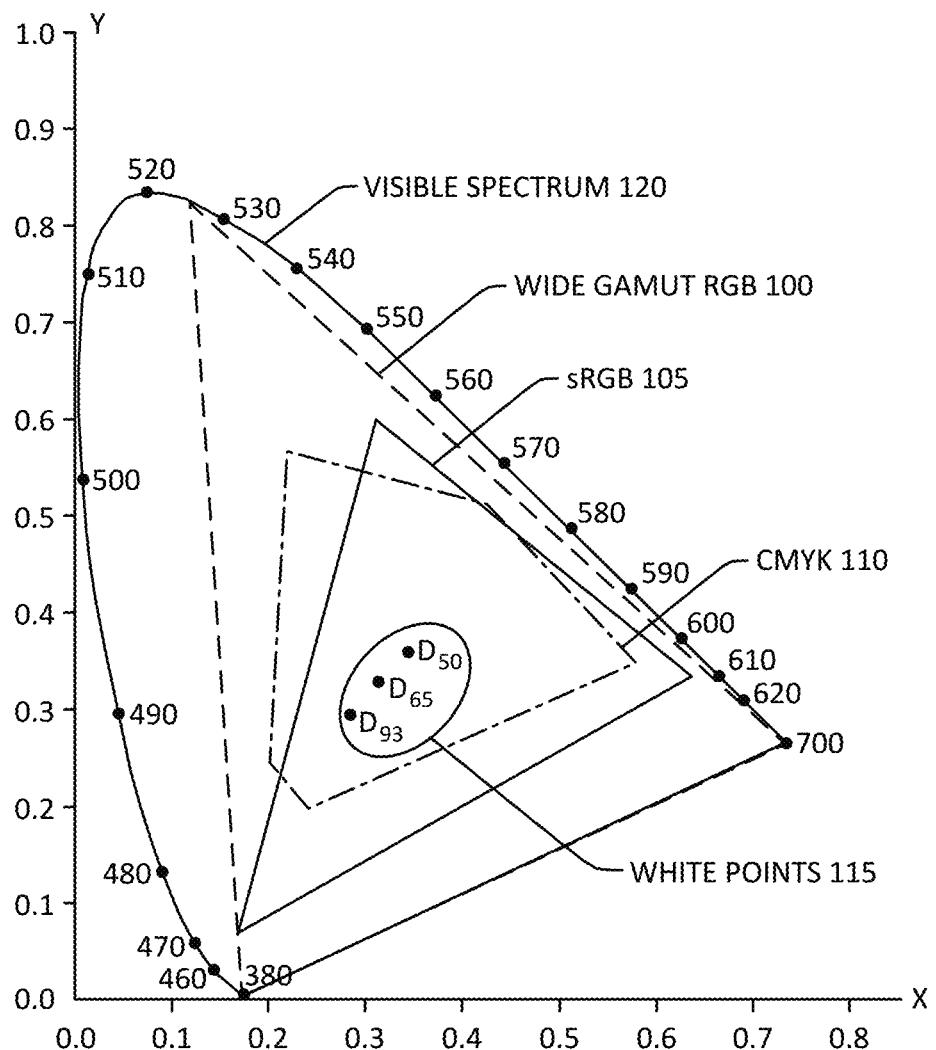
FIG. 1 illustrates different perceptual color systems.

This disclosure pertains to systems, methods, and computer readable media to identify a gamut size metric for use in all phases of color image processing (e.g., capture, transmission, and display). In general, techniques are disclosed for determining a single-valued metric that changes as image content changes. More particularly, techniques disclosed herein may be used to efficiently determine a gamut boundary histogram which may be used to estimate a gamut size metric. A gamut size metric as disclosed herein identifies a minimum size gamut needed to encompass each pixel in an image, where the gamut size is limited at one end by a first device independent gamut ($S_1$), and at another end by a second device independent color space ($S_2$), where $S_1$ is wholly enclosed within $S_2$. The described gamut size metric may be based on strict pixel color value differences. In other embodiments the gamut size metric may take into effect perceptual color differences and significance.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of color processing systems having the benefit of this disclosure.

By far the most common color representations or models used in digital imaging involve three (3) primaries. For simplicity but not limitation, further discussion herein will be limited to linear 3-primary additive color systems where colors are characterized by 3-tuples representing a linear combination of 3 primary colors. These color spaces are typically defined by the color values of their primaries. For example, one such color model is the sRGB color model (see FIG. 1 at 105). The differences in primaries results in differences not only in their gamuts but may also result in their white points being different (see FIG. 1 at 105). Some color models differ not only in their gamuts but also their white points (see FIG. 1 at 115). When converting color values from one color space to another, while preserving perceptual appearance as much as possible, adaptation to the new white point may need to be considered. Modeling adaptation from one white point to another white point is a separate topic not within the scope of this disclosure, and is a well-known issue to those working within the field of color science. For this reason, the following description also assumes that for different color systems with different gamuts, their white points are consistent or nearly consistent so that there is no need to apply white point adaptation operations.

Even with these constraints, color gamut size measurement is an ill-defined problem, as 2 sets of primaries may have the same size but cover different regions of a color space. Compare, for example, sRGB gamut 105 and CMYK gamut 110 which cover approximately the same area, but slightly different regions within wide gamut RGB gamut 100. Even in a truly perceptually uniform color space, gamut size comparison between two gamuts where one doesn't enclose another is still not very meaningful. As a consequence, the gamut size metric in accordance with this disclosure is further constrained to 3-color systems $S_1$ and $S_2$ with primaries $[R_1, G_1, B_1]$ and $[R_2, G_2, B_2]$ respectively, where $S_1$'s color gamut is completely enclosed by $S_2$ and that the corresponding primaries of the 2 systems are reasonably similar in hue (e.g., both $S_1$ and $S_2$ have RGB primaries). One such illustrative relationship is illustrated in FIG. 1 with respect to gamuts 100 (wide gamut RGB) and 105 (sRGB).

For convenience and not limitation, a gamut size metric in accordance with this disclosure will be on an interval scale with 0 corresponding to the smaller gamut of $S_1$, and 1 corresponding to the larger gamut of $S_2$. In such a system, the gamut size metric described herein may be thought of as indicating whether the gamut needed for an image is closer to $S_1$ or $S_2$'s gamut. Color systems $S_1$ and $S_2$ may be defined per application and include any color gamuts as long as they satisfy the constraints identified above. With this formulation, any collection of hypothetical primaries that are mixtures of $S_1$ and $S_2$ may be described as:

$$[R_x, G_x, B_x] = (1-x)[R_1, G_1, B_1] + x[R_2, G_2, B_2]; 0 \leq x \leq 1. \quad \text{EQ. 1.}$$

Primaries of the type that satisfy EQ. 1 satisfy the constraint that any set of primaries with a smaller x is enclosed by those primaries with larger x, and therefore a gamut comparison among them is meaningful.

For each pixel in an image, the minimum value x (also referred to as the "gamut boundary value") for which the gamut defined by $[R_x, G_x, B_x]$ can enclose the pixel's color may now be determined. Let $M_1$ be the color matrix that transforms a device-independent color space (e.g. xyz) to the display color space of $S_1$, and $M_2$ be the color matrix that transforms the same device-independent color space to the display color space $S_2$. From EQ. 1 it is easy to see that the color matrix that transforms a given device-independent color space to the display color space of $S_x$ is a linear mixture of $M_1$ and $M_2$:

$$M_x = (1-x)M_1 + xM_2. \quad \text{EQ. 2}$$

If $[r_x, g_x, b_x]$ represents the color values (as rendered for color system $S_x$ having primaries $[R_x, G_x, B_x]$) of a pixel with device-independent values $[r_0, g_0, b_0]$, then:

$$[r_x, g_x, b_x]^t = M_x[r_0, g_0, b_0]^t = [(1-x)M_1 + xM_2][r_0, g_0, b_0]^t. \quad \text{EQ. 3}$$

For all 3 color values to be within the gamut range of $[R_x, G_x, B_x]$ the following must be true:

$$0 < [(1-xr)M_1 + xrM_2]r_0 < 1, \quad \text{EQ. 4A}$$

$$0 < [(1-xg)M_1 + xgM_2]g_0 < 1, \quad \text{EQ. 4B}$$

$$0 < [(1-xb)M_1 + xbM_2]b_0 < 1. \quad \text{EQ. 4C}$$

It is relatively easy to solve for the minimum $x_r$, $x_g$, and $x_b$ gamut boundary values needed to satisfy the constraints identified in EQ. 4 (and the computational load to do so is light). By way of example, let $S_1$ be the sRGB color space having RGB values [r, g, b] and let $S_2$ be a wide gamut color space $P_3$ (having the same, or nearly the same, white point as $S_1$ so that white point adaptation need not be considered) having RGB values $[r_2, g_2, b_2]$ (note, this is "inverted" from the exposition above, but models what an implementer of a system in accordance with this disclosure is likely to see). From above, $$M_1 M_2^{-1} \begin{bmatrix} r_2 \\ g_2 \\ b_2 \end{bmatrix} = A \begin{bmatrix} r_2 \\ g_2 \\ b_2 \end{bmatrix} = \begin{bmatrix} a_1 & a_2 & a_3 \\ a_4 & a_5 & a_6 \\ a_7 & a_8 & a_9 \end{bmatrix} \begin{bmatrix} r_2 \\ g_2 \\ b_2 \end{bmatrix} \quad \text{EQ. 5A}$$

In accordance with EQ. 4, the following must hold:

$$0 < (1-x)A \begin{bmatrix} r_2 \\ g_2 \\ b_2 \end{bmatrix} + x \begin{bmatrix} r_2 \\ g_2 \\ b_2 \end{bmatrix} < 1. \quad \text{EQ. 5B}$$

For $$r_2 = 0 < (1-x)(a_1 r_2 + a_2 g_2 + a_3 b_2) + x r_2 < 1, \quad \text{EQ. 5C}$$

let $$r_a = a_1 r_2 + a_2 g_2 + a_3 b_2 \quad \text{EQ. 5D}$$

(representing sRGB's r value), then $$\begin{cases} (1-x)r_a + x r_2 < 1 \\ (1-x)r_a + x r_2 > 0 \end{cases}. \quad \text{EQ. 5E}$$

If $r_a < r_2$ (the case when sRGB $P_3$), the EQ. 5E leads to:

$$\begin{cases} x > (r_a - 1)/(r_a - r_2) \\ x < r_a/(r_a - r_2) \end{cases}. \quad \text{EQ. 5F}$$

Similarly for G and B primaries:

$$\begin{cases} x > (g_a - 1)/(g_a - g_2) \\ x < g_a/(g_a - g_2) \end{cases}, \quad \text{EQ. 5G}$$

$$\begin{cases} x > (b_a - 1)/(b_a - b_2) \\ x < b_a/(b_a - b_2) \end{cases}. \quad \text{EQ. 5H}$$

Using EQS. 5F-5H, estimates for gamut boundary values of $x_r$, $x_g$ and $x_b$ needed to satisfy the constraints in EQ. 4 are simply the boundary values in the above equations, and thus the combined gamut boundary value x for this pixel is:

$$x = \max(x_r, x_g, x_b). \quad \text{EQ. 6}$$

Figure 2:
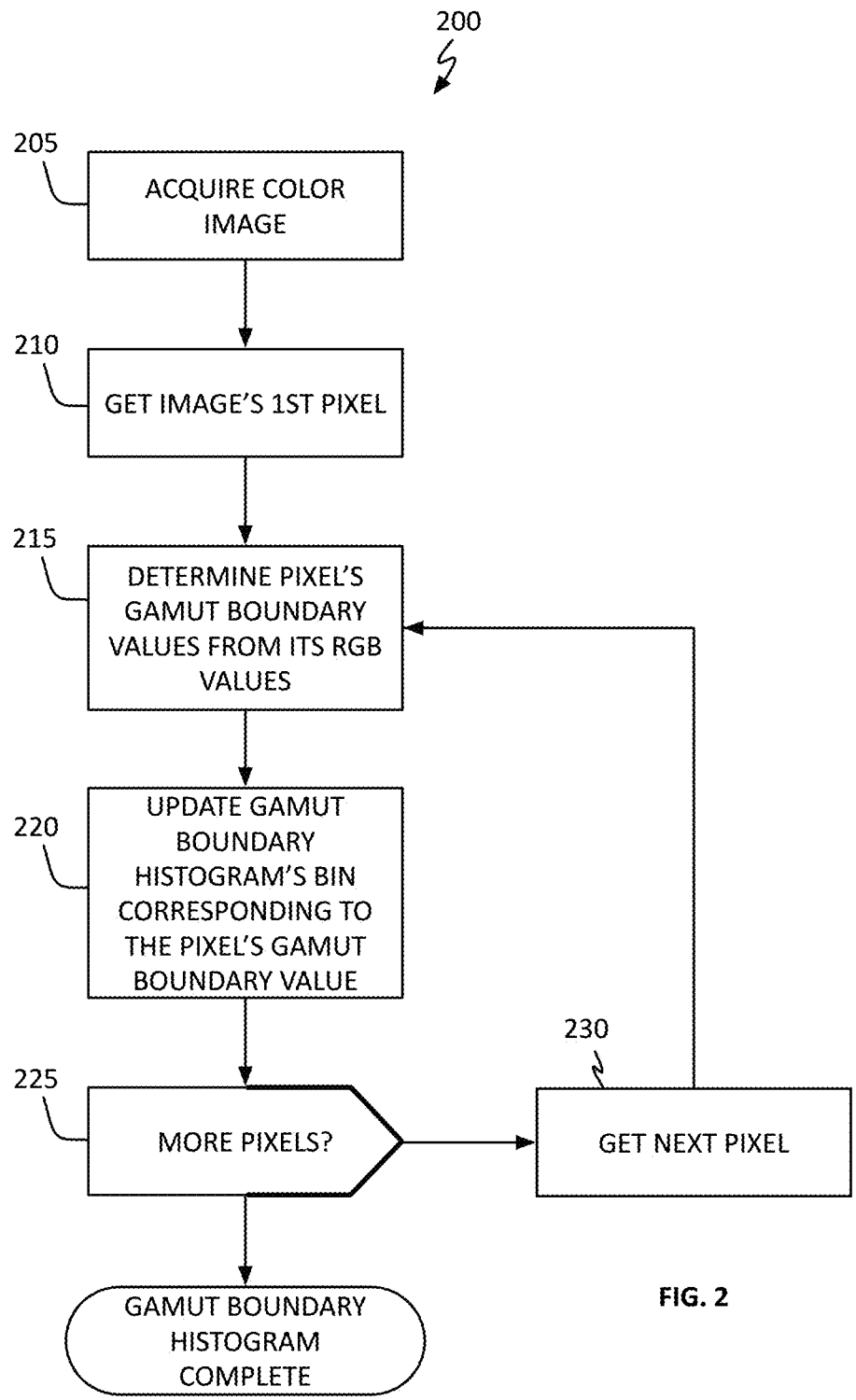
FIG. 2 shows, in flow chart form, a gamut boundary histogram operation in accordance with one embodiment.

Referring to FIG. 2, gamut boundary histogram operation 200 in accordance with one embodiment may begin by acquiring a color image (block 205) and, from that image, selecting a first pixel (block 210). A gamut boundary value x in accordance with, for example, EQS. 5-6 may be determined (block 215) where after the gamut boundary histogram's bin corresponding to the determined gamut boundary value may be incremented (block 215). In one embodiment, the gamut boundary histogram's bin corresponding to the determined gamut boundary value may be incremented or increased by one. In another embodiment the gamut boundary histogram's bin corresponding to the determined gamut boundary value may be increased by the pixel's visibility weight (w) as discussed more fully below. If additional pixels remain to be evaluated in accordance with blocks 215-220 (the "YES" prong of block 225), a next pixel may be obtained (block 230) and operation 200 continued at block 215. Otherwise (the "NO" prong of block 225), gamut boundary histogram operation 200 completes.

It may be worth noting that the gamut boundary histogram may be better generated on a low-resolution version of the acquired image. Saturated colors at scattered pixels are common when an image is noisy. Saturated colors at scattered pixels (as compared to a large block of saturated colors) are often neither reflective of an object's actual color, nor visually significant in the image. Using a low resolution version of the acquired image (e.g., one that is blurred and subsampled) reduces the impact of such pixels and has been found to give a gamut boundary histogram more suitable for estimating the true gamut range for the image. It may be also worth noting that gamut range estimation results from different low resolution images of an original full resolution image may be combined to identify an optimal gamut boundary for the image. It will be understood that lower resolution images are inherently less sensitive to noise, so a lower resolution version of an original image may be used for gamut boundary estimation of a high noise image.

Using EQ. 6 to calculate the gamut boundary value x at block 220 treats the contribution of r, g, and b equally. Since most display RGB spaces are not perceptually uniform, this treatment may be considered suboptimal, especially if the goal is to avoid widening a color gamut for a perceptually insignificant gain in color accuracy. This "perceptual visibility issue" may be taken into account by finding a "visibility weight" for each out-of-gamut pixel in addition to its gamut boundary value x. For a pixel with device-independent values $[r_0, g_0, b_0]$, its rendered color values in space $S_2$ may be expressed as:

$$[r_2, g_2, b_2] = \text{clip}(M_2 [r_0, g_0, b_0]^t, 0, 1),  \quad \text{EQ. 7}$$

and in $S_1$ as:

$$[r_1, g_1, b_1] = \text{clip}(M_1 [r_0, g_0, b_0]^t, 0, 1).  \quad \text{EQ. 8}$$

Converting the $S_1$-clipped pixels into the $S_2$ color space, gives:

$$(r_t, g_t, b_t) = M_2 M_1^{-1} (r_1, g_1, b_1)^t,  \quad \text{EQ. 9}$$

which does not require clipping since $S_2$ has a larger gamut that $S_1$. Thus, $(r_t, g_t, b_t)$ is guaranteed to be in the [0, 1] range.

If computational constraints are not limiting, a perceptual color difference such as the CIE DeltaE2000 value dE between $[r_t, g_t, b_t]$ and $[r_2, g_2, b_2]$ may be determined and used as a pixel's visibility weight. If computational constraints are limiting, as may be the case on a mobile platform (e.g., a mobile phone or tablet computer system), dE may be approximated by using a weighted sum of pixel RGB differences between $[r_t, g_t, b_t]$ and $[r_2, g_2, b_2]$:

$$w = [c_r, c_g, c_b][d_r, d_g, d_b]^t,  \quad \text{EQ. 10}$$

where $[d_r, d_g, d_b]$ represents the pixel RGB error introduced by rendering $S_2$ colors into $S_1$ and clipping to the range used for [r, g, b] values:

$$d_r = |r_t - r_2|,  \quad \text{EQ. 11A}$$

$$d_g = |g_t - g_2|, \text{ and}  \quad \text{EQ. 11B}$$

$$d_b = |b_t - b_2|.  \quad \text{EQ. 11C}$$

In this approach values for $[c_r, c_g, c_b]$ need to be determined such that the difference between w and dE are minimized for typical colors that are out of the $S_1$ gamut but within the $S_2$ gamut. In one embodiment this may be done by simulating the RGB responses in $S_1$ and in $S_2$ of highly colorful object surfaces under various illuminants, and finding the best fitting $[c_r, c_g, c_b]$ that minimized the mean squared error between w and dE. The gamut boundary histogram may then be determined by using the sum of visibility weights for each pixel calculated in this way, instead of using pixel count per bin. By way of example, during gamut boundary histogram generation, for each pixel instead of adding a count of '1' to the bin it belongs to, a visibility weight value such as dE may be added to the bin. More generally, an accumulation may be made by taking the sum of $w^n$ (also represented as power(w, n)), so that the summation of perceptual weight is more in line with experimental evidence on supra-threshold summation. In one embodiment, for example, n=2 may be used.

Once a gamut boundary histogram has been determined, the minimum gamut size needed to enclose all pixels in an image may be established by finding the gamut size corresponding to the last non-zero bin of the histogram (i.e., the 100% cutoff point). In general however, a 100% cutoff estimate has not been found very useful in practice for two reasons. First, sometimes a single pixel can require a large gamut while the rest of the image may fit in a much smaller or narrow gamut. In some applications it may be desirable to go to a narrower gamut for such images. Second, using a 100% cutoff can cause the gamut size to swing wildly when a small number of highly saturated colors enter or exit an image frame (e.g., during real-time processing of a video stream), making a gamut size metric unstable. In one embodiment this stability issue may be addressed by using a "balance point" or "equilibrium point" or "fulcrum" instead of a cutoff point to determine a gamut size.

Figure 3:
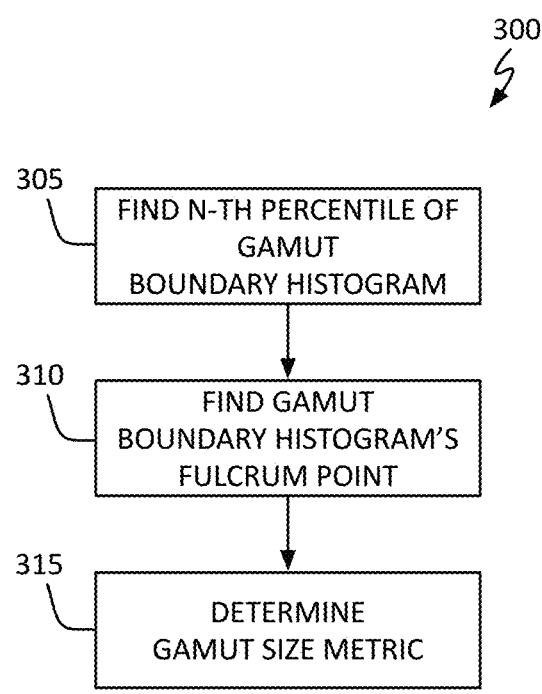
FIG. 3 shows, in flow chart form, a gamut size metric operation in accordance with one embodiment.

A gamut size metric in accordance with this disclosure may be determined in accordance with the following steps as illustrated in FIG. 3 (operation 300):

1. Find the n-th percentile $x_n$ of the gamut boundary histogram, with n determined according to the need of each application or implementation (block 305). In one embodiment n may be taken to be a value close to 100% or 100%.
2. Considering only that portion of the gamut boundary histogram between the n-th and the 100-th percentile, treat the values in each histogram bin as weights. Find the fulcrum f of this portion of the histogram such that the sum of moments (weight×distance) on the two sides off is equal (block 310). In practice, this f may resolve to a non-integer value such as a·b which may be interpreted as b % of the (a+1)-th bin value. In one embodiment, when 'a' is the last bin, f may be set to 0 (i.e., f=0).
3. That gamut size corresponding to the $(x_n + f)$ bin may be taken as an estimate of the image's gamut size (block 315). As noted above, bin locations can take on non-integer values.

Figure 4:
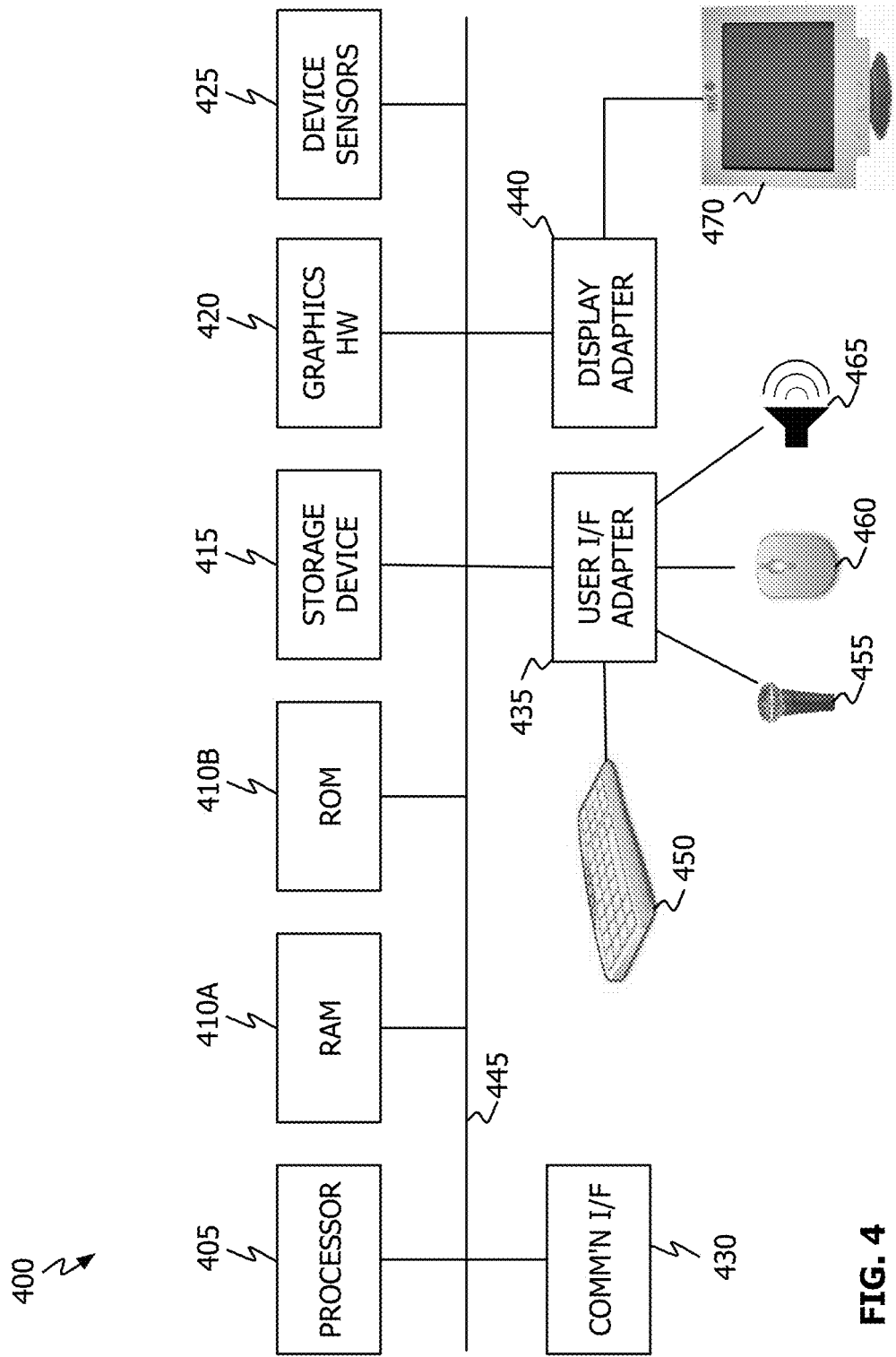
FIG. 4 shows, in block diagram form, a computer system in accordance with one embodiment.

Referring to FIG. 4, the disclosed color gamut size metric operations may be performed by representative computer system 400 (e.g., a general purpose computer system such as a desktop, laptop, notebook or tablet computer system). Computer system 400 may include one or more processors 405, memory 410 (410A and 410B), one or more storage devices 415, graphics hardware 420, device sensors 425 (e.g., 3D depth sensor, proximity sensor, ambient light sensor, accelerometer and/or gyroscope), communication interface 430, user interface adapter 435 and display adapter 440—all of which may be coupled via system bus or backplane 445 which may be comprised of one or more continuous (as shown) or discontinuous communication links. Memory 410 may include one or more different types of media (typically solid-state) used by processor 405 and graphics hardware 420. For example, memory 410 may include memory cache, read-only memory (ROM), and/or random access memory (RAM). Storage 415 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 410 and storage 415 may be used to retain media (e.g., audio, image and video files), preference information, device profile information, computer program instructions or code organized into one or more modules and written in any desired computer programming language, and any other suitable data. When executed by processor(s) 405 and/or graphics hardware 420 such computer program code may implement one or more of the methods described herein. Communication interface 430 may be used to connect computer system 400 to one or more networks. Illustrative networks include, but are not limited to, a local network such as a USB network, an organization's local area network, and a wide area network such as the Internet. Communication interface 430 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 435 may be used to connect keyboard 450, microphone 455, pointer device 460, speaker 465 and other user interface devices such as a touch-pad and/or a touch screen (not shown). Display adapter 440 may be used to connect one or more display units 470 which may provide touch input capability. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable GPUs and each such unit may include one or more processing cores.

Figure 5:
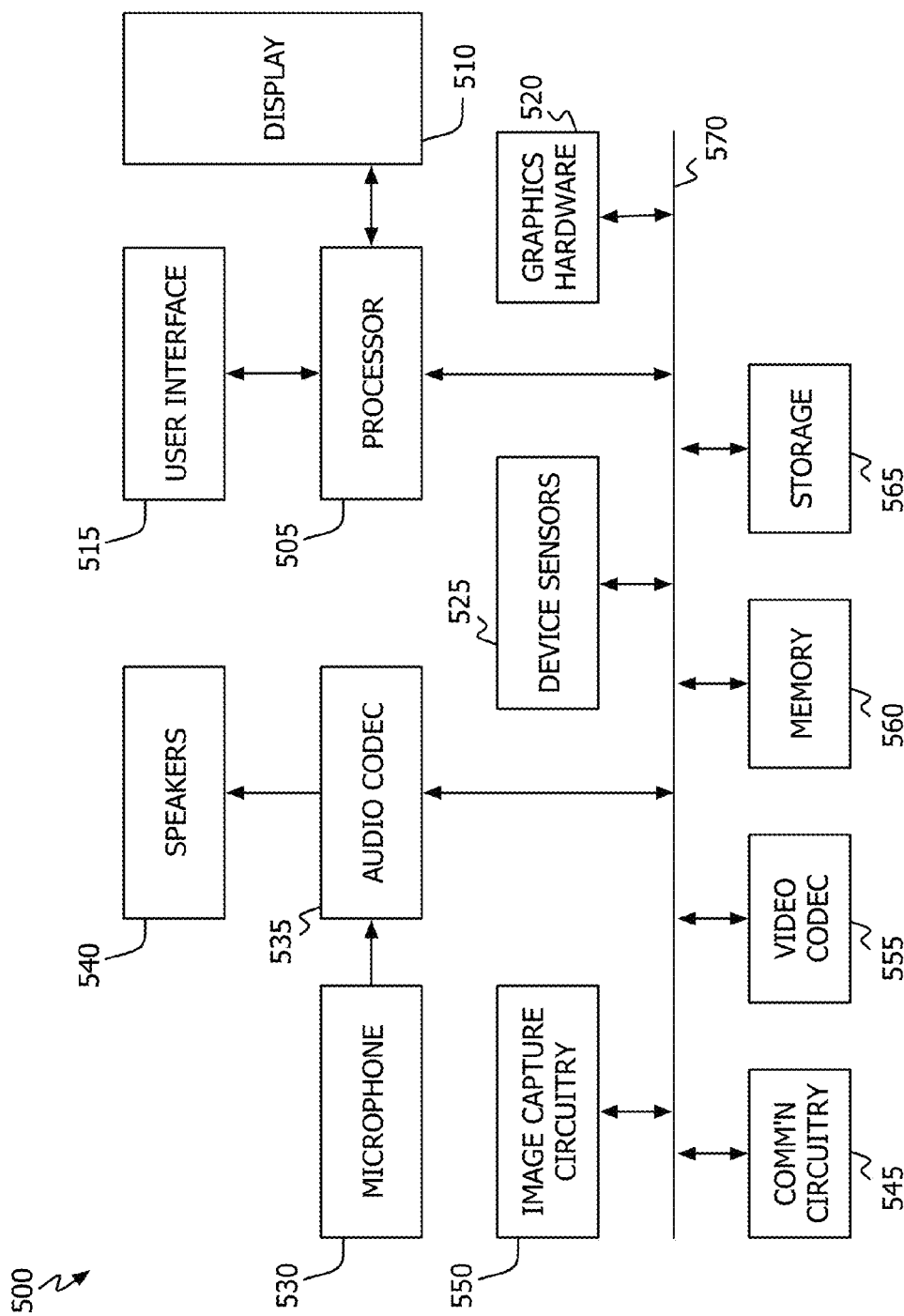
FIG. 5 shows, in block diagram form, a multi-function electronic device in accordance with one embodiment.

Referring to FIG. 5, a simplified functional block diagram of illustrative mobile electronic device 500 is shown according to one embodiment. Electronic device 500 could be, for example, a mobile telephone, personal media device, a notebook computer system, or a tablet computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture circuit or unit 550, video codec(s) 555, memory 560, storage 565, and communications bus 570.

Processor 505, display 510, user interface 515, graphics hardware 520, device sensors 525, communications circuitry 545, memory 560 and storage 565 may be of the same or similar type and serve the same function as the similarly named component described above with respect to FIG. 4. Audio signals obtained via microphone 530 may be, at least partially, processed by audio codec(s) 535. Data so captured may be stored in memory 560 and/or storage 565 and/or output through speakers 540. Image capture circuitry 550 may capture still and video images. Output from image capture circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565.

As described herein, a single valued gamut size metric may be determined that varies as the images to which it is applied vary (e.g., from frame-to-frame in a video sequence of frames). Where the identified gamut size is limited at one end by a first device independent gamut ($S_1$) and at another end by a second device independent color space ($S_2$), where $S_1$ is wholly enclosed within $S_2$. The disclosed gamut size metric may be based on a gamut boundary histogram that measures, represents or characterizes the minimal difference needed to render a given pixel from an image into a gamut defined by [$R_x$, $R_g$, $R_b$]. An efficient means to determine a gamut boundary histogram is described. A gamut boundary histogram, and therefore the disclosed gamut size metric, may (but need not) take into account the perceptual color differences and significance between the $S_1$ and $S_2$ color spaces.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art. In one or more embodiments, one or more of the disclosed steps illustrated in FIGS. 2 and 3 may be omitted, repeated, and/or performed in a different order than that described herein. Accordingly, the specific arrangement of steps or actions shown in FIGS. 2 and 3 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for gamut size estimation in image processing, comprising:
    obtaining a color image;
    processing, by a computer processor, each of a plurality of pixels of the color image by—
        determining a gamut boundary value for a pixel, wherein the gamut boundary value identifies a smallest size gamut that encapsulates the pixel, and
        updating a bin of a gamut boundary histogram that corresponds to the gamut boundary value; and
    determining, by the computer processor, a gamut size metric based on the gamut boundary histogram, wherein the gamut size metric is indicative of a minimum gamut needed to represent the color image.

2. The method of claim 1, wherein determining the gamut size metric comprises:
    selecting a relevant portion of the gamut boundary histogram;
    determining an equilibrium point of the selected relevant portion of the gamut boundary histogram; and determining the gamut size metric based on the selected portion of the gamut boundary histogram and the identified equilibrium point.

3. The method of claim 2, wherein selecting a relevant portion of the gamut boundary histogram comprises:
identifying a percentile value;
identifying a bin in the gamut boundary histogram corresponding to the percentile value, the bin corresponding to the percentile value forming a first end of the relevant portion of the gamut boundary histogram; and
setting a second end of the relevant portion of the gamut boundary histogram equal to a highest bin of the gamut boundary histogram.

4. The method of claim 2, wherein determining an equilibrium point of the selected relevant portion of the gamut boundary histogram comprises:
assigning a weight corresponding to a count for each of the bins of the relevant portion of the gamut boundary histogram; and
determining a balance point of the relevant portion of the gamut boundary histogram based on moments corresponding to the weight for each of the bins of the relevant portion of the gamut boundary histogram.

5. The method of claim 4, wherein determining the gamut size metric is further based on a function of the balance point.

6. The method of claim 1, wherein acquiring a color image comprises:
acquiring an original color image; and
obtaining a lower resolution version of the original color image.

7. The method of claim 1, wherein updating a bin of a gamut boundary histogram comprises updating the bin of the gamut boundary histogram corresponding to the gamut boundary value by an amount equal to a visibility weight value for the pixel.

8. A non-transitory program storage device comprising instructions stored thereon to cause one or more processors to:
obtain a color image;
process each of a plurality of pixels of the color image by—
determining a gamut boundary value for a pixel, wherein the gamut boundary value identifies a smallest size gamut that encapsulates the pixel, and
updating a bin of a gamut boundary histogram that corresponds to the gamut boundary value; and
determine a gamut size metric based on the gamut boundary histogram, wherein the gamut size metric is indicative of a minimum gamut needed to represent the color image.

9. The non-transitory program storage device of claim 8, wherein the instructions to cause the one or more processors to determine a gamut size metric further comprise instructions to cause the one or more processors to:
select a relevant portion of the gamut boundary histogram;
determine an equilibrium point of the selected relevant portion of the gamut boundary histogram; and
determine the gamut size metric based on the selected portion of the gamut boundary histogram and the identified equilibrium point.

10. The non-transitory program storage device of claim 9, wherein the instructions to cause the one or more processors to select a relevant portion of the gamut boundary histogram comprise instructions to cause the one or more processors to:
identify a percentile value;
identify a bin in the gamut boundary histogram corresponding to the percentile value, the bin corresponding to the percentile value forming a first end of the relevant portion of the gamut boundary histogram; and
set a second end of the relevant portion of the gamut boundary histogram equal to a highest bin of the gamut boundary histogram.

11. The non-transitory program storage device of claim 9, wherein the instructions to cause the one or more processors to determine an equilibrium point of the selected relevant portion of the gamut boundary histogram comprise instructions to cause the one or more processors to:
assign a weight corresponding to a count for each of the bins of the relevant portion of the gamut boundary histogram; and
determine a balance point of the relevant portion of the gamut boundary histogram based on moments corresponding to the weight for each of the bins of the relevant portion of the gamut boundary histogram.

12. The non-transitory program storage device of claim 11, wherein the instructions to cause the one or more processors to determine the gamut size metric further comprise instructions to cause the one or more processors to determine the gamut size metric based on a function of the balance point.

13. The non-transitory program storage device of claim 8, wherein the instructions to cause the one or more processors to acquire a color image comprise instructions to cause the one or more processors to:
acquire an original color image; and
obtain a lower resolution version of the original color image.

14. The non-transitory program storage device of claim 8, wherein the instructions to cause the one or more processors to update a bin of a gamut boundary histogram comprise instructions to cause the one or more processors to increment the bin of the gamut boundary histogram corresponding to the gamut boundary value by an amount equal to a visibility weight value of the pixel.

15. An electronic device, comprising:
a memory; and
one or more processors operatively coupled to the memory and configured to execute instructions stored in the memory to cause the electronic device to—
obtain a color image from the memory;
process each of a plurality of pixels of the color image by—
determining a gamut boundary value for a pixel, wherein the gamut boundary value identifies a smallest size gamut that encapsulates the pixel, and
updating a bin of a gamut boundary histogram that corresponds to the gamut boundary value; and
determine a gamut size metric based on the gamut boundary histogram, wherein the gamut size metric is indicative of a minimum gamut needed to represent the color image.

16. The electronic device of claim 15, wherein the instructions to cause the electronic device to determine a gamut size metric further comprise instructions to cause the electronic device to:
select a relevant portion of the gamut boundary histogram;
determine an equilibrium point of the selected relevant portion of the gamut boundary histogram; and determine the gamut size metric based on the selected portion of the gamut boundary histogram and the identified equilibrium point.

17. The electronic device of claim 16, wherein the instructions to cause the electronic device to select a relevant portion of the gamut boundary histogram comprise instructions to cause the electronic device to:
 identify a percentile value;
 identify a bin in the gamut boundary histogram corresponding to the percentile value, the bin corresponding to the percentile value forming a first end of the relevant portion of the gamut boundary histogram; and
 set a second end of the relevant portion of the gamut boundary histogram equal to a highest bin of the gamut boundary histogram.

18. The electronic device of claim 16, wherein the instructions to cause the electronic device to determine an equilibrium point of the selected relevant portion of the gamut boundary histogram comprise instructions to cause the electronic device to:
 assign a weight corresponding to a count for each of the bins of the relevant portion of the gamut boundary histogram; and
 determine a balance point of the relevant portion of the gamut boundary histogram based on moments corresponding to the weight for each of the bins of the relevant portion of the gamut boundary histogram.

19. The electronic device of claim 18, wherein the instructions to cause the electronic device to determine the gamut size metric further comprise instructions to cause the electronic device to determine the gamut size metric based on a function of the balance point.

20. The electronic device of claim 15, wherein the instructions to cause the electronic device to acquire a color image comprise instructions to cause the electronic device to:
 acquire an original color image; and
 obtain a lower resolution version of the original color image.

21. The electronic device of claim 15, wherein the instructions to cause the electronic device to update a bin of a gamut boundary histogram comprise instructions to cause the electronic device to update the bin of the gamut boundary histogram corresponding to the gamut boundary value by an amount equal to a visibility weight value of the pixel.

* * * * *